United States Patent [19]

Shibamiya

[11] Patent Number: 4,837,712
[45] Date of Patent: Jun. 6, 1989

[54] DATA PROCESSING APPARATUS

[75] Inventor: Yoshikazu Shibamiya, Tokyo, Japan

[73] Assignee: Canon Kabushiki Kaisha, Tokyo, Japan

[21] Appl. No.: 131,243

[22] Filed: Dec. 7, 1987

Related U.S. Application Data

[63] Continuation of Ser. No. 707,825, Mar. 4, 1985, abandoned.

[30] Foreign Application Priority Data

Mar. 15, 1984 [JP] Japan .............................. 59-48168
Mar. 15, 1984 [JP] Japan .............................. 59-48169

[51] Int. Cl.$^4$ .............................................. G06F 9/00
[52] U.S. Cl. ...................................... 364/523; 400/70; 364/519
[58] Field of Search ................... 364/518, 519, 523; 400/70, 72, 76

[56] References Cited

U.S. PATENT DOCUMENTS

| | | | |
|---|---|---|---|
| 3,964,591 | 6/1976 | Hill et al. ............................ | 400/72 |
| 4,388,010 | 6/1483 | Mott et al. .......................... | 400/121 |
| 4,594,674 | 6/1986 | Boulia et al. ....................... | 364/523 |
| 4,715,006 | 12/1987 | Nagata ............................... | 364/523 |

FOREIGN PATENT DOCUMENTS

3128360 2/1983 Fed. Rep. of Germany .
3436033 4/1985 Fed. Rep. of Germany .
3437221 4/1985 Fed. Rep. of Germany .

Primary Examiner—L. T. Hix
Assistant Examiner—David M. Gray
Attorney, Agent, or Firm—Fitzpatrick, Cella, Harper & Scinto

[57] ABSTRACT

A data processing apparatus comprises a document memory which stores a document, and a type style in which the document should be printed out is designated. The document may also be edited. The document memory further stores a code to discriminate the designated type style. An external character generator ROM which stores a type style in which the document can be printed out may be connected to the apparatus. When a CPU detects that the external ROM is connected to the apparatus, the document is printed out in the type style stored in the external ROM in spite of the designated type style. When the CPU detects that no external ROM is connected to the apparatus, the document may be printed out in a type style stored in an internal character generator ROM incorporated in the apparatus.

7 Claims, 5 Drawing Sheets

DATA PROCESSING APPARATUS

This application is a continuation of application Ser. No. 707,825 filed 3/4/85, now abandoned.

BACKGROUND OF THE INVENTION

1. Field of the Invention

The present invention relates to data processing apparatus, such as typewriters or word processors which use a memory to store font or type styles.

2. Description of the Prior Art

Conveniently, a typewriter is known which includes a character generator ROM (referred to as ROM pack hereinafter) which is disconnectable from and connectable with the typewriter proper and which stores dot patterns in accordance with a print font or type style, and a character generator ROM which is incorporated in the typewriter proper and which stores a dot pattern corresponding to a print font or type style (referred to as internal type style hereinafter) different from the first-mentioned type style (referred to as external type style). In the typewriter, there are cases where an external type style is designated and a document stored in a document memory is printed. In those cases, if no external ROM pack which stores the designated type style is connected with the typewriter proper, generally speaking, print in the designated type style is stopped and connection of the ROM pack which stores the designated type style is requested.

There are, however, some cases where print is desired in spite of the particular type style. In addition, there are some cases where print is desired using the internal type style when the ROM pack which stores the designated external type style is not at hand or is lost. In those case, a print type style must be designated again, i.e., this operation is troublesome and the typewriter does not work so efficiently.

Also, there are some circumstances where print is required using a type style which is different from other type styles although the specified details of the difference are not required. Furthermore, there are certain cases where print is desired using a ROM pack at hand which stores an external type style when no ROM pack which stores the designated external type style is at hand. In those cases, however, a print type style must be set again, i.e. this operation is troublesome and the typewriter does not work so efficiently.

In view of the above, it is an object of the present invention to provide a data processing apparatus which performs a print operation using a ROM pack connected to the apparatus although the ROM pack stores an external type style different from that designated when the document is stored, thereby providing enhanced efficiency of print operation.

It is another object of the present invention to provide a data processing apparatus which has a mode of performing a print operation using a character generator ROM which stores an internal type style when a ROM pack which stores an external type style is not connected to the apparatus, thereby providing enhanced efficiency of print operation.

DESCRIPTION OF THE PREFERRED EMBODIMENT

Now, the present invention will be described in more detail with respect to the drawings.

Figure 1:
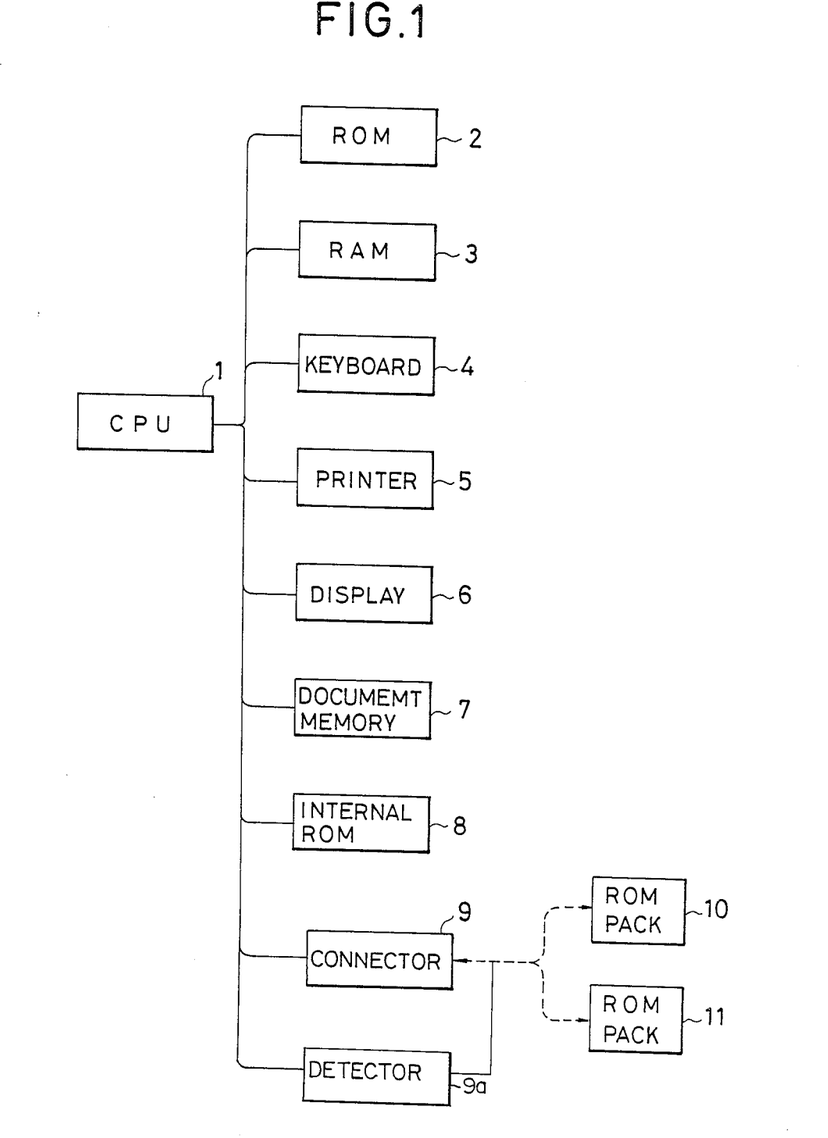
FIG. 1 is a block diagram showing an example of the structure of a data processing apparatus of the present invention.

FIG. 1 illustrates an example of the structure of a typewriter as the data processing apparatus according to the present invention. Reference numeral 1 denotes a central processing unit (CPU) in the form of a microprocessor which controls the respective elements of the typewriter to be described in more detail hereinafter in accordance with a predetermined manner, and prints and edits documents. Reference numeral 2 denotes a read only memory (ROM) which stores a program to control the respective elements of the typewriter in a predetermined manner, for example shown in FIG. 3.

Reference numeral 3 denotes a writeable and readable random access memory (RAM) which temporarily stores data obtained from the results of operation of the CPU 1 and/or data inputted from a keyboard 4, etc. The keyboard 4 includes character and sign keys to input document data and function keys to instruct printing and editing operation, etc. The function keys include a key for designating a compulsory print mode.

Figure 2:
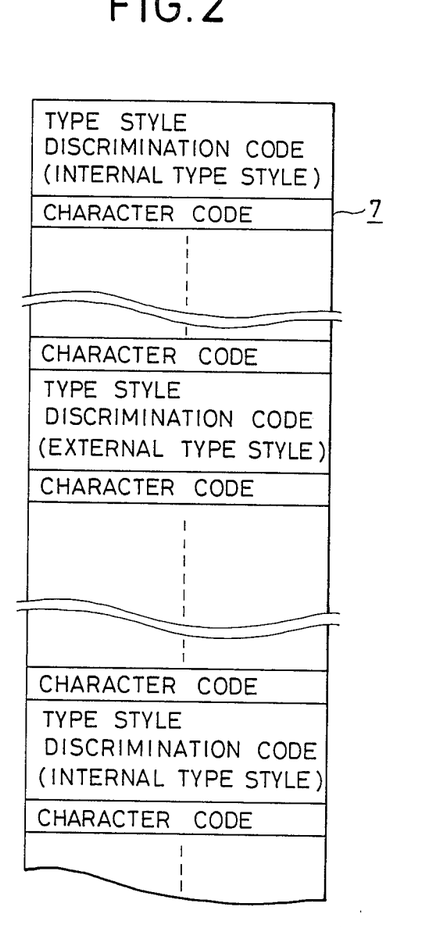
FIG. 2 illustrates an example of the contents stored in a document memory of FIG. 2.

Reference numeral 5 denotes a printer which may be a dot printer or the like which prints the contents inputted from the keyboard 4 and the contents of a document memory, to be described in more detail hereinafter, in a designated type style. Reference number 6 denotes a display which may be a liquid crystal display or the like which displays various data inputted from the keyboard 4, the data obtained from the results of operation of the CPU 1 on the basis of the former data, and/or the contents of the document memory 7, etc. In the memory 6, print type styles are designated, and edited documents are stored, as shown in FIG. 2, for example.

Reference numeral 8 denotes an internal character generator ROM (referred to as internal ROM hereinafter) which stores print type styles (internal type styles) in the form of a dot pattern in which the printer 5 deforms a print operation. When one of the internal type styles is designated, the printer 5 performs a print operation in the designated type style. The internal ROM 8 is previously provided irremovably within the typewriter proper.

Reference numeral 9 denotes a connector which electrically connects ROM packs 10 and 11 to the apparatus proper. The ROM packs 10 and 11 are read only memories for external expansion and store print type styles (external type styles) in the form of a dot pattern and different from those stored in the internal ROM 8. In use, they are connected with the connector 9. When one of them is not used, it is removed from the connector for preservation separately. When the ROM packs 10 and 11, the external type styles of which are specified, are connected to the connector 9, the printer 5 may perform a print operation in the designated type style.

Means, 9A, are provided which detect whether or not the ROM pack 10 or 11 is connected with the connector 9 and provides the resulting signal to the CPU 1.

The operation of the typewriter according to the present invention now will be described.

In the inventive apparatus, selection and designation of a print type style are performed before an operator inputs via the keyboard 4 the document which the operator wants to print in the type style. That is, once a print type style is selected, the document inputted via the keyboard 4 is printed by the printer 5 in the type style until the type style is replaced.

This applies when a type style is designated in the document memory 7, an edited document is stored in the memory 7 and the contents of the memory are printed. In this case, if the ROM pack 10 or 11 as the external type style is connected to the connector 9, the external type style can be selected. If not, the external type style can not be selected.

FIG. 2 illustrates an example of the contents of a document stored in the document memory 7 of FIG. 1 such that the respective contents are printed in the order of arrangement of an internal type style, an external type style and an internal type style. In this case, the respective internal type style designating codes and the respective groups of character codes are stored in the following order: first, a control code to designate an internal type style (a style discriminating code) is stored, a corresponding group of character codes to be printed in the designated internal type style (and the related control code) are stored, then another control code to designate an external type style is stored, a corresponding group of character codes to be printed in this external type style, and the related code are stored, and a further code to designate an internal type style and a corresponding group of character codes are stored.

Figure 3:
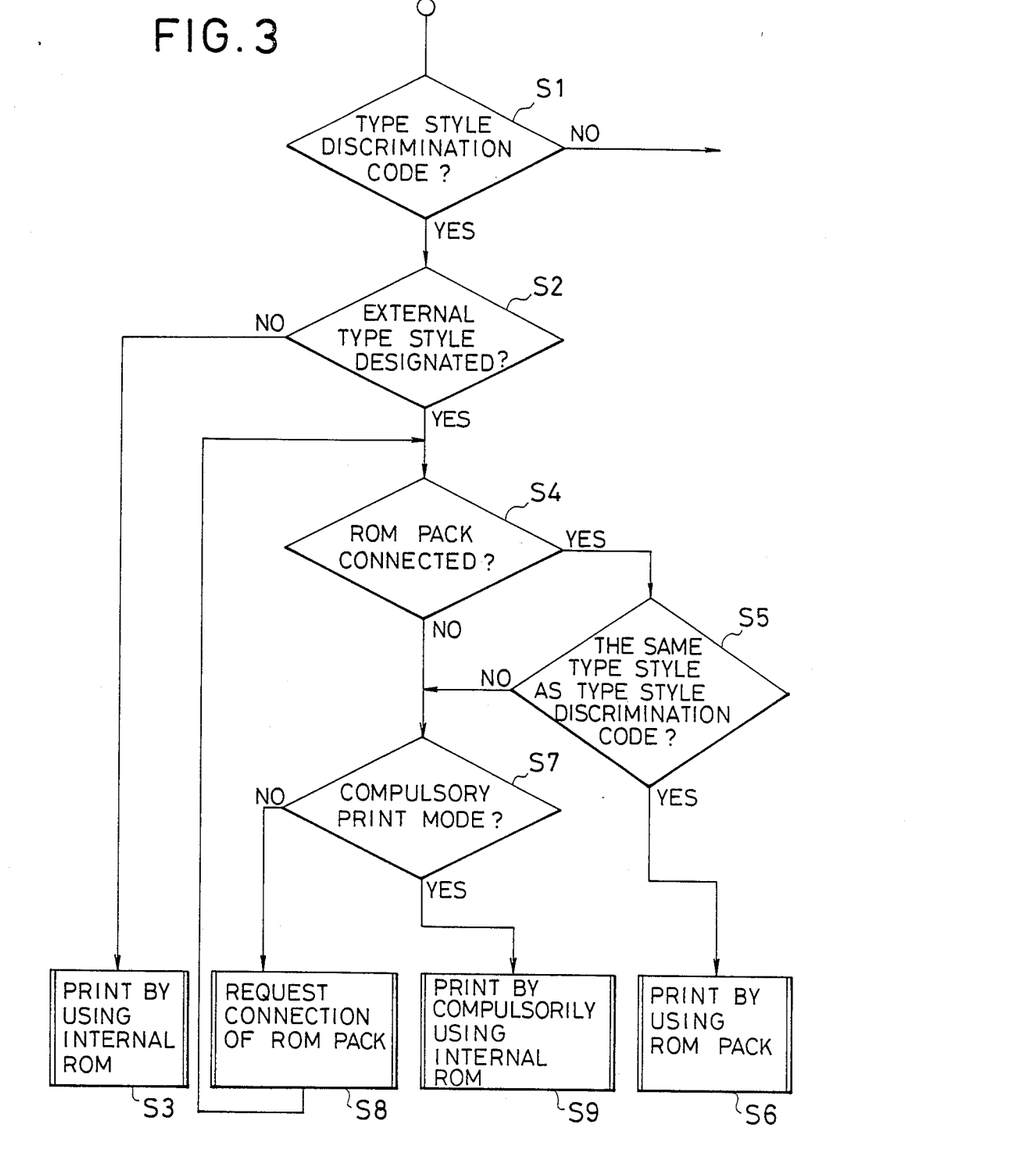
FIG. 3 is a flowchart showing an example of control of one embodiment according to the present invention.

Control of the embodiment of the present invention will be described in more detail with respect to the flowchart of FIG. 3.

Printing the documents stored in the document memory 7 is started by designating a document in the memory and pressing a print start key disposed in the keyboard 4. When print starts, CPU 1 reads the stored contents out of the memory 7 while controlling the printer 5 to perform print operation. In this case, of course, assume that documents, etc., are stored in the memory 7, as shown in FIG. 2.

As described above, the contents stored in the memory 7 are read. Then, it is determined whether or not the read contents are a document discriminating code. At a step S1, when the read contents are the style discriminating code, it is determined in a step S2 whether or not the style discriminating code designates the external type style or the internal one. If it is determined to be the internal style at the step S2, the printer 5 performs print operation in the internal type style using the internal ROM 8 at a step S3 until the next style discriminating code appears.

On the other hand, when the discriminating code is determined to be the external type style at the step S2, it is determined at a step S4 whether or not the ROM pack 10 or 11 is connected to the connector 9. It is ROM pack 10 or 11 is determined to be connected to the connector at the step S4, it is determined at a step S5 whether or not the external type style stored in the ROM pack 10 or 11 connected to the connector 9 is the same as the above-mentioned discriminating code. If it is determined to be the same, control passes to a step S6 where the printer 5 performs print operation using the ROM pack 10 or 11 connected to the connector 9.

On the other hand, if the style discriminating code is determined at the step S5 to be different from that of ROM pack 10 or 11 connected to the connector 9, or if the ROM pack 10 or 11 is determined not to be connected to the connector 9 at the step S4, it is determined at a step S7 whether or not a compulsory print mode is designated. If the compulsory print mode is determined not to be designated at the step S7, a connection or replacement message relating to the ROM pack 10 or 11 is displayed by the display 6, thereby stopping the print operation of the printer 5 temporarily at a step S8.

On the other hand, if it is determined to be the compulsory print mode at the step S7, the printer 5 performs print operation using the internal type style, i.e. the internal ROM 8 at a step S9 although the style discriminating code designates the external type style.

As described above, in the above embodiment, the compulsory print mode is provided, print operation is compulsorily performed using the internal type style i.e. the internal ROM 8 although the ROM pack 10 or 11 corresponding to the external type style designated at the time of registration of the document into the document memory 7 is not connected to the connector 9.

As described above, according to the above embodiment of the present invention, when the contents of a document memory means in which a print type style is designated, a document is edited and stored and printed and when a connectable and disconnectable character generator ROM is not connected with the typewriter proper, the contents of the document memory means can be printed using the internal character generator ROM in spite of the absence of the designated print type style. Thus, when a character generator which should be connected with the typewriter proper is not at hand or is lost, etc., print output may be provided, thereby improving print operation greatly.

Now, the present invention will be described in more detail with respect to the drawings.

Figure 4:
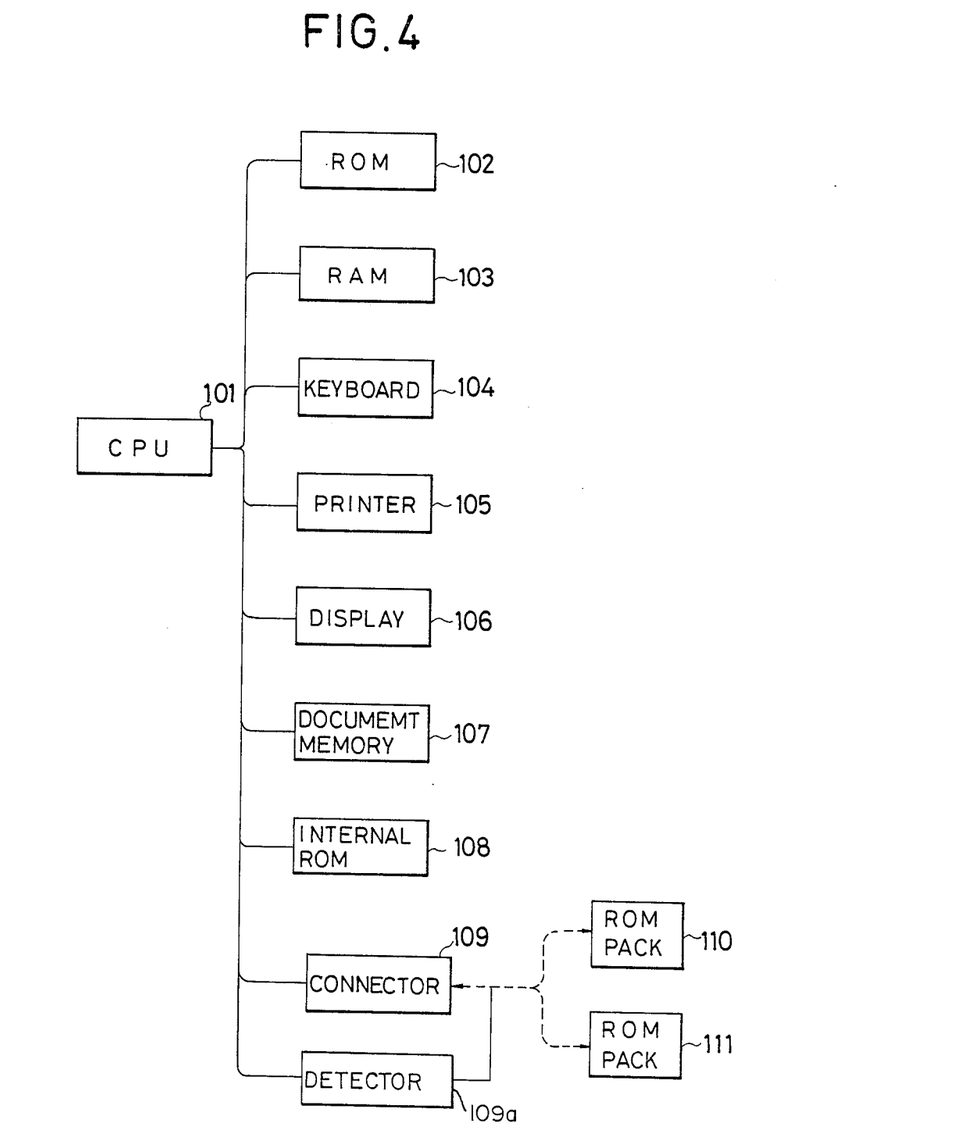
FIG. 4 is a block diagram showing an example of the structure of a data processing apparatus of the present invention.

FIG. 4 illustrates another example of the structure of a typewriter as the data processing apparatus according to the present invention. Reference numeral 101 denotes a central processing unit (CPU) in the form of a microprocessor which controls the respective elements of the typewriter, to be described in more detail hereinafter, in a predetermined manner, and prints and edits documents. Reference numeral 102 denotes a read only memory (ROM) which stores a program to control the respective elements of the typewriter in a predetermined manner, for example shown in FIG. 3.

Reference numeral 103 denotes a writable and readable random access memory (RAM) which temporarily stores data obtained from the results of operation of the CPU 101 and/or data inputted from a keyboard 104, etc. The keyboard 104 includes character and sign keys to input document data and function keys to instruct printing and editing operations, etc. The function keys include a key for designating an external font style nonselection mode.

Reference numeral 105 denotes a printer which may be a dot printer or the like which prints the contents inputted from the keyboard 104 and the contents of a document memory, to be described in more detail hereinafter, in a designated type style. Reference numeral 106 denotes a display which may be a liquid crystal display or the like which displays various data inputted from the keyboard 104, the data obtained from the results of operation of the CPU 101 on the basis of the former data, and/or the contents of the document memory 107, etc. In the memory 107, print type styles are designated, and edited documents are stored, as shown in FIG. 2, for example.

Reference numeral 108 denotes an internal character generator ROM (referred to as internal ROM hereinafter) which stores print type styles (internal type styles) in the form of a dot pattern in which the printer 105 performs a print operation. When one of the internal type styles is designated, the printer 105 performs a print operation in the designated type style. The internal ROM 108 is previously provided irremovably within the typewriter proper.

Reference numeral 109 denotes a connector which electrically connects ROM packs 110 and 111 to the apparatus proper. The ROM packs 110 and 111 are read only memories for external expansion and store print type styles (external type styles) in the form of a dot pattern and different from those stored in the internal ROM 108. In use, they are connected with the connector 109. When one of them is not used, it is removed from the connector for preservation separately. When the ROM packs 110 and 111, the external type styles of which are specified, are connected to the connector 109, the printer 105 may perform a print operation in the designated type style.

Means, not shown, are provided which detect whether or not the ROM pack 110 or 111 is connected with the connector 109 and provides the resulting signal to the CPU 101.

The operation of this typewriter according to the present invention now will be described.

In the inventive apparatus, selection and designation of a print type style are performed before an operator inputs via the keyboard 104 the document which the operator wants to print in the type style. That is, once a print type style is selected, the document inputted via the keyboard 4 is printed by the printer 5 in the type style until the type style is replaced.

This applies when a type style is designated in the document memory 107, an edited document is stored in the memory 107 and the contents of the memory are printed. In this case, if the ROM pack 110 or 111 as the external type style is connected to the connector 109, the external type style can be selected. If not, the external type style can not be selected.

FIG. 2 again illustrates an example of the contents of a document stored in the document memory 107 of FIG. 4 such that the respective contents are printed in the order of arrangement of an internal type style, an external type style and an internal type style. In this case, the respective internal type style designating codes and the respective groups of character codes are stored in the following order: first, a control code to designate an internal type style (a style discriminating code) is stored, a corresponding group of character codes to be printed in the designated internal type style (and the related control code) are stored, then another control code to designate an external type style is stored, a corresponding group of character codes to be printed in this external type style, and the related code are stored, and a further code to designate an internal type style and a corresponding group of character codes are stored.

Now, control of the second embodiment of the present invention will be described in more detail with respect to the flowchart of FIG. 5.

Figure 5:
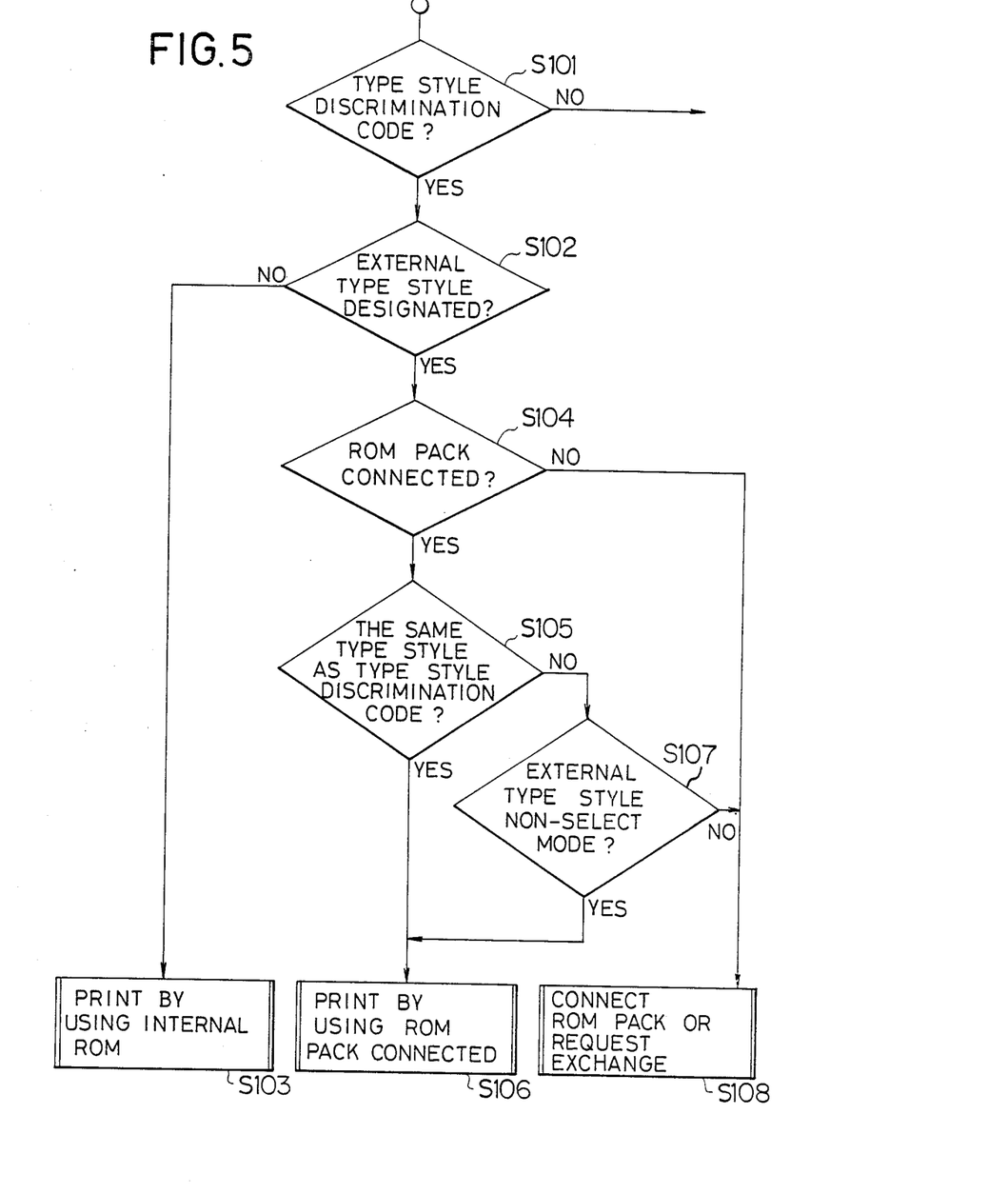
FIG. 5 is a flowchart showing an example of control of one embodiment according to the present invention.

Assume that the external ROM packs 110 and 111, which store external type styles different from that stored in the document memory 107 shown in FIG. 5, are connected to the connector 109.

First, the print of the documents registered in the document memory 107 is started by designating a document to be printed and pressing the print start key disposed in the keyboard 104.

When print is started, the CPU 101 reads the stored contents from the document memory 107 while controlling the printer 105 so as to perform a print operation. At this time, assume that the style discriminating codes are stored between the character codes, as shown in FIG. 2.

As described above, and shown in FIG. 5 the contents of the document memory 107 are read, and it is determined in a step S101 whether or not the read contents are a style discriminating code. When they are determined to be the style discriminating code, it is determined at a step S102 whether or not the style discriminating code designates an external or internal type style. If it is determined at the step S102 to be the internal style, the printer 105 performs print operation in the internal type style using the internal ROM 108 at the step S103 until the next style discriminating code appears. When the determination is NO at the step S101 a corresponding control is performed.

On the other hand, when the discriminating code is determined to be an external type style at the step S102, it is determined at a step S104 whether or not the ROM pack 110 or 111 is connected with the connector 109. If the ROM pack 110 or 111 is determined at the step S104 to be connected to the connector 109, it is determined at a step S105 whether or not the external type style stored in the ROM pack 110 or 111 connected to the connector 109 is the same as that designated by the discriminating code. If it is determined to be the same, control passes to a step S106 where the printer 105 perform print operation using the ROM 110 or 111 connected to the connector 109.

On the other hand, when the style discriminating code is determined at the step S105 to designate a type style different from that of the ROM pack 110 or 111 connected to the connector 109, it is determined at a step S107 whether or not an external type style non-selection mode which means compulsory print using the ROM pack 110 or 111 connected actually to the connector 109 is designated. When the external style non-selection is designated at the step S107, the printer 105 performs print operation at a step S106, using the ROM pack 110 which is connected at present to the connector 109 by ignoring the designated external type style code which is different from that representing the external type style 110 or 111, for example, connected to the connector 109.

When it is determined at the step S107 that no external style non-selection mode is designated or when it is determined at the step S104 that neither of the ROM packs 110 and 111 is connected to the connector 109, a message to request connection or replacement the ROM pack 110 or 111 is displayed by the display 106 and the print operation of the printer 105 is stopped temporarily in step S108.

As described above, in the second embodiment, since the external type style non-selection mode is provided, the print operation of the printer 105 can be continued using the type style of a ROM pack, for example the ROM pack 110, connected actually with the connector 109 without stopping print operation although the external type style of the ROM pack is different from that designated when the document was registered into the document memory 107.

As described above, according to the second embodiment of the present invention, when the contents of the document memory means in which the print type style are stored and an edited document is stored should be printed, and when a character generator ROM the print type style of which is different from the designated one, is connected with the apparatus proper, the contents of the document memory means can be printed using the connected ROM although the type style of this ROM is different from the designated one. Thus, when a desired character generator to be connected with the apparatus proper is not at hand or is lost, a print out is provided anyway in spite of the type style, thereby greatly improving print operation.

As an alternative to the second embodiment, a control means can be provided to control the print means in such a manner that when the detection means detects that one of the external memory is connected to the data processing apparatus when the document stored in the document memory 107 is visualized or printed, the document is processed in type style stored in the detected external memory regardless of designated type style.

What I claim is:

1. Information processing apparatus comprising;
    first memory means for storing data of a predetermined font style;
    second memory means detachable from the apparatus for storing data of a font style different from said predetermined font style stored in said first memory means;
    font style indication means for indicating the font style to be read out from said first memory means or second memory means;
    compulsory read-out means for selectively instructing a compulsory read-out of data of the predetermined font style from said first memory means; and
    control means in response to the compulsory read-out instruction for reading out the data from said first memory means when said second memory means is detached from the apparatus.

2. Information processing apparatus according to claim 1 further comprising:
    means for visualizing the data read-out from said first or second memory means by said control means.

3. Information processing apparatus according to claim 2, wherein said visualizing means is a printer.

4. Information processing apparatus according to claim 3 further comprising:
    detection means for detecting the detachment of said second memory means from the apparatus body; and
    apparatus stopping means responsive to the detachment detection for permitting the connection of said second memory means to the apparatus when there is not compulsory read-out instruction.

5. Information processing apparatus, comprising:
    a plurality of memory units, each detachable from the apparatus for storing data of different font styles;
    indication means for indicating the font style to be read-out from one of said plurality of memory units;
    code information output means for adding discrimination information to code information to read out the data of a font style, the discrimination information being used to make a discrimination on the indicated font style,
    compulsory selection means for indicating a compulsory selection of the font style of data to be read out; and
    control means responsive to the indication by said compulsory selection means for selecting the font style to be compulsorily read out and reading out the data of the selected font style from one of said memory units.

6. Information processing apparatus according to claim 5 further comprising:
    means for visualizing the data read-out from said memory units by said control means.

7. Information processing apparatus according to claim 6, wherein said visualizing means is a printer.

* * * * *

UNITED STATES PATENT AND TRADEMARK OFFICE
CERTIFICATE OF CORRECTION

PATENT NO. : 4,837,712
DATED : June 6, 1989
INVENTOR(S) : Yoshikazu Shibamiya

It is certified that error appears in the above identified patent and that said Letters Patent is hereby corrected as shown below:

On the title page:

[56] References Cited:
   Change "4,388,010 6/1483 Mott et al." to --4,388,010 6/1983 Mott et al.--.

COLUMN 1
   Line 13, change "Conveniently," to --Conventionally,--.
   Line 32, change "style." to --style available.--.
   Line 36, change "case," to --cases,--.

COLUMN 2
   Line 2, change "FIG. 2;" to --FIG. 1;--.
   Line 32, change "operation," to --operations,--.
   Line 50, change "de-" to --per--.

COLUMN 3
   Line 1, change "Means, 9A," to --Means 9a--.
   Line 47, change "assume" to --it is assumed--.
   Line 63, change "It is" to --If--.

UNITED STATES PATENT AND TRADEMARK OFFICE
CERTIFICATE OF CORRECTION

PATENT NO. : 4,837,712
DATED : June 6, 1989
INVENTOR(S) : Yoshikazu Shibamiya

It is certified that error appears in the above-identified patent and that said Letters Patent is hereby corrected as shown below:

COLUMN 4
 Line 30, change, "designated" to --designated, and--; and "edited and" to --edited,--.

COLUMN 6
 Line 15, change "assume" to --assumed--.
 Line 41, change "perform" to --performs--.
 Line 42, change "ROM 110 or 111" to --ROM pack 110 or 111--.
 Line 63, change "replacement the" to --replacement of the--.

COLUMN 7
 Line 19, change "print out" to --printout--.

Signed and Sealed this

Seventeenth Day of July, 1990

Attest:

HARRY F. MANBECK, JR.

Attesting Officer

Commissioner of Patents and Trademarks